July 21, 1964 J. L. SMITH 3,142,048
MAGNETIC MEMORY CIRCUIT
Filed Dec. 16, 1960
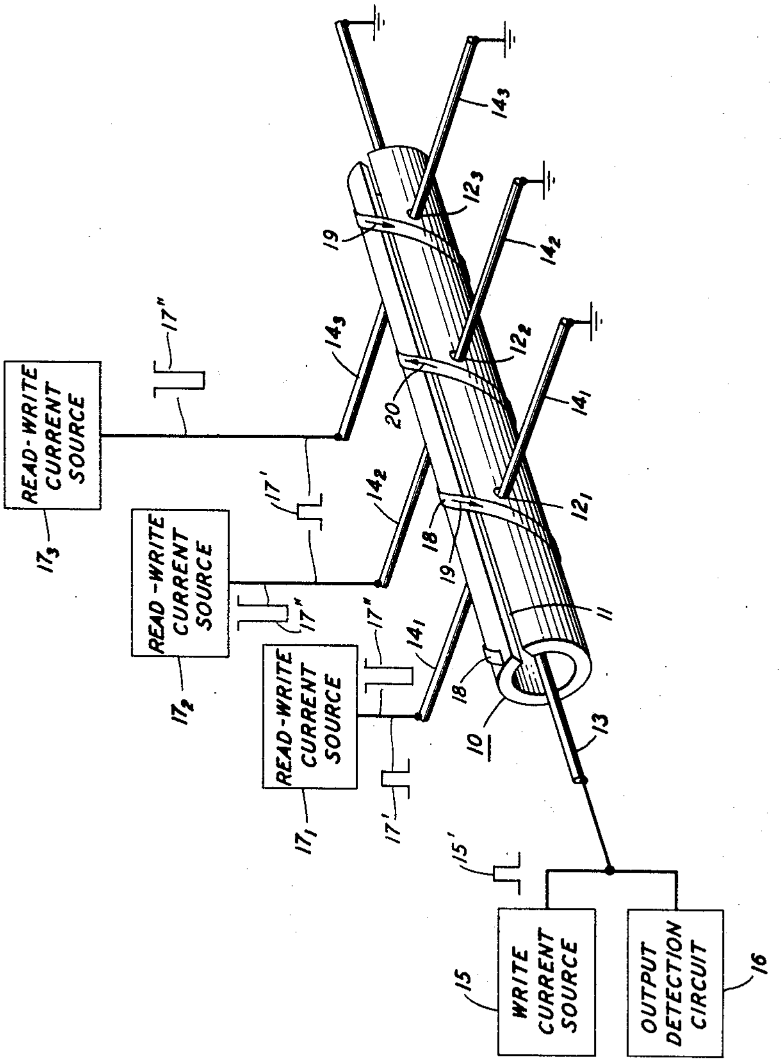
INVENTOR
J. L. SMITH
BY
William H. Kamstra
ATTORNEY United States Patent Office 3,142,048

Patented July 21, 1964

3,142,048
MAGNETIC MEMORY CIRCUIT

James L. Smith, Basking Ridge, N.J., assignor to Bell Telephone Laboratories, Incorporated, New York, N.Y., a corporation of New York Filed Dec. 16, 1960, Ser. No. 76,409
10 Claims. (Cl. 340—174)

This invention relates to information storage arrangements and more particularly to such arrangements in which information is stored in the form of remanent flux states of magnetic memory elements.

Magnetic information storage arrangements employing magnetic memory elements as information storage addresses are well known in the information handling and processing art. The substantially rectangular hysteresis characteristics of the magnetic materials of which such memory elements are fabricated enable the elements to store binary values by being magnetized in either of two remanent flux states. The well-known toroidal magnetic core, for example, has one binary value associated with one of the remanent states and the other binary value with the other of the remanent states. Which of the binary values is stored in the core at any given time is determined by applying a read-out current pulse to a winding inductively coupled to the core. Should a reversal of the magnetic flux from one of its remanent states to the other remanent state occur as a result of the read-out current pulse, a voltage will be induced across a sensing coil also inductively coupled to the core, which voltage will be indicative of a particular binary value.

Other core geometries which operate on magnetic switching principles similar to those of the two-state toroidal magnetic core are also known. Thus, for example, a magnetic wire element in which flux switching is also performed in memory circuit embodiments and which element presents a highly advantageous departure from previous arrangements is described by A. H. Bobeck in the copending application Serial No. 675,522, filed August 1, 1957, now U.S. Patent No. 3,083,353, issued March 26, 1963. Information is stored in the magnetic wire element in the form of polarized magnetizations of a helical flux path axially coincident with the memory wire. The helical flux path associated with the memory wire may be established, for example, by twisting a suitable magnetic wire, or advantageously, by wrapping a magnetic tape helically about a non-magnetic center conductor. The information stored in a particular bit address defined along the memory wire is determined by the magnetic polarization of that portion of the helical flux path associated with the particular bit address. A particular polarization state is determined by the magnitude and direction of the selection fields. Axial selection fields may be generated by current passing through a solenoid concentric with the memory wire while circular fields may be generated by passing current down the memory wire itself. By adjusting each field so that it alone is insufficient to affect the direction of magnetization while their vector sum exceeds the threshold required for reversing the direction of magnetization, coincident current selection is advantageously achieved. Of course, a large enough axial or circular field can be used alone for flux reversal and the reading out of stored information may advantageously be accomplished by utilizing a single large axial field. The wire memory element is thus used as both the storage medium and as one of the access wires and may additionally serve as the sense wire since it "senses" a change in the direction of the magnetic flux and the voltage thereby induced is propagated to sensing amplifiers.

With respect to the structure of wire memory elements it is clear from their continuous nature that the closure of a remanent flux in an information address segment defined thereon will be along an air return path. This is distinguished from more conventional core elements in which the flux is substantially entirely within the core structure itself. Many bits of information may be stored along each memory wire of a typical memory array with each bit address being separated from an adjacent bit address by a buffer region on the wire. The storage density ordinarily obtained represents a compromise between drive currents, output signals, and demagnetizing factors. The buffer regions must be of a length sufficient to prevent demagnetizing effects, caused by the air return flux paths of each bit address, from interfering with the magnetic condition of adjacent bit addresses. The flux closure path of each bit address along a single wire element must be completed without interference with flux closure paths of bit addresses arranged on other nearby wire elements as well as without interference with flux closure paths of bit addresses on the same wire element. Furthermore, each bit address must be of a length sufficient to prevent the demagnetizing effects from interfering with the rectangularity of the hysteresis characteristics of the addresses. The required minimum separation between wire elements and between bit addresses along a single wire element tends to place a ceiling on the number of information bits which may be stored in a particular memory array.

Accordingly, it is an object of this invention to provide a memory array in which a greater storage density may be obtained than has heretofore been realized in magnetic wire arrays.

It is another object of this invention to store binary information bits by means of a new and novel memory element.

It is a further object of this invention to provide a memory array utilizing coincident current techniques in which a faster switching cycle is achieved than has heretofore been realized in magnetic wire arrays.

It is a still further object of this invention to provide a memory array utilizing drive currents of a lower magnitude than heretofore required in magnetic wire arrays.

The above and other objects are realized in one embodiment according to the principles of this invention comprising a high permeability magnetic tube having a longitudinal slot and a number of holes periodically drilled at right angles to the slot. Magnetic tape having a substantially rectangular hysteresis characteristic is helically wound around the tube so that the tape crosses the slot in the vicinity of the holes. One access wire is threaded through the center of the tube and other access wires are threaded through the holes in the tube to define bit addresses along the length of the tube. Axial selection fields are generated by currents passing through the access wires threaded through the holes in the tube and a circular selection field is generated by a current passing through the central access wire. The particular polarization state of the magnetic flux in the portions of the tape crossing the slot in the tube is determined by the magnitude and direction of the selection fields. By adjusting each field so that it alone is insufficient to affect the direction of magnetization in the tape while their vector sum in the vicinity of the slot exceeds the threshold required for reversing the direction of magnetization, coincident current selection is advantageously achieved. The remanent flux induced in the tape in the vicinity of the slot closes via a return path within the tube of high permeability magnetic material. The presence of the high permeability tube eliminates the necessity of depending on an air return path for the induced flux and thereby eliminates the demagnetizing effects produced by such air paths. Read out of an information bit may advantageously be achieved by means of a single large axial field produced by a current passing through that one of the access wires threaded through the holes in the tube which is associated with the particular bit address. The access wire threaded through the center of the tube then senses any change in the direction of the magnetic flux and the voltage thereby induced is propagated to sensing amplifiers. The virtual elemination of demagnetizing effects caused by air return flux paths permits bit addresses to be located more closely together along a single element and permits these elements to be spaced more closely together in a memory array comprising such elements.

Thus, according to one feature of this invention, the remanent magnetic flux assocaited with each information address of a memory element closes through material having a substantially rectangular hysteresis characteristic and also through material having a high permeability and a more linear hysteresis characteristic.

According to another feature of this invention a longitudinally slotted high permeability magnetic tube has one access wire threaded through the center thereof and a plurality of access wires threaded through holes periodically drilled along the sides of the tube. A square loop magnetic tape placed over the slot in inductive coupling with the tube in the vicinity of an access wire comprises the actual storage address.

The foregoing and other objects and features of this invention will be more clearly understood from a consideration of the detailed description thereof which follows when taken in conjunction with the accompanying drawing, the single figure of which depicts one specific illustrative embodiment of a magnetic memory element according to the principles of this invention.

The drawing shows a cylindrical tube 10 of a magnetic material having a high magnetic permeability and substantially linear hysteresis characteristics. The tube 10 has a longitudinal slot 11 therein and holes $\mathbf{12}_1$ $\mathbf{12}_2$ and $\mathbf{12}_3$ drilled entirely through opposite portions thereof. An access wire 13 is threaded through the center of tube 10 and is connected between a source of ground potential at one end and both a write current source 15 and an output detection circuit 16 at the other end. Access wires $\mathbf{14}_1$, $\mathbf{14}_2$ and $\mathbf{14}_3$ are threaded through the holes $\mathbf{12}_1$, $\mathbf{12}_2$ and $\mathbf{12}_3$, respectively, and are connected between a source of ground potential and read-write current sources $\mathbf{17}_1$, $\mathbf{17}_2$ and $\mathbf{17}_3$, respectively. A magnetic tape 18 having a substantially rectangular hysteresis characteristic is helically wound about the tube 10 and crosses the slot 11 in the vicinity of each of the holes 12. An information address is thus defined on the tape 18 at each of the cross points of the access wires 13 and 14. The current sources 17 and 15 are shown in block diagram form and may comprise well-known circuits capable of providing read and write signals of the nature described hereinafter. The detection cricuit 16 is also shown in block diagram form and may comprise any circuit capable of detecting output signals induced in access wire 13. Bearing in mind the foregoing organization, a detailed description of an illustrative operation of this circuit will now be set forth.

As a result of the application of negative read-out current pulses from the readwrite sources 17 during an assumed previous read-out phase of operation, there is a remanent magnetization in those portions of the tape 18 in the vicinity of the slot 11 defined as the information addresses. For purposes of description, these magnetizations will be assumed as being upward and to the right in the helical path of the tape as viewed in the drawing. The remanent magnetizations, which exist in the tape 18 only at the information addresses, close through the high permeability magnetic tube 10. The remanent magnetizations thus existing in the tape 18 prior to the illustrative write operation which is to be described, are conventionally regarded as clear magnetic states and, as will become clear hereinafter, these clear states also correspond to the states representative of one of the binary information bits. The organization of the memory arrangement shown in the drawing is one in which each of the information addresses shares the common access wire 13 and also has its individual access wire 14.

Information may now be written into the information addresses by conventional coincident current techniques. Positive current pulses 17′ are selectively applied to the access wires 14 from the sources 17 in accordance with the particular binary information bits which are to be written into the bit addresses. Coincidently with the current pulses 17′ a positive current pulse 15′ is applied to the access wire 13. The pulses 17′ and 15′ are each of a magnitude which is insufficient to reverse the magnetizations in any of the bit addresses; however, the vector sums of the fields produced by the pulses 17′ and 15′ are sufficient to exceed the threshold required for reversing the magnetic flux in the bit addresses. This flux reversal occurs in the addresses in which binary "1's" are to be stored in the conventional coincident current write manner. For purposes of description, it will be assumed that binary "1's" are to be stored in the bit addresses defined by the access wires $\mathbf{14}_1$ and $\mathbf{14}_3$ and a binary "0" is to be stored in the information address defined by the access wire $\mathbf{14}_2$. The magnetic states representative of binary "1's" are symbolized in the drawing by the arrows 19.

In the case of the information address to contain a binary "0," the magnetic flux in the address does not experience a flux reversal and the magnetic state in the latter address thus remains in the clear state, which state thus corresponds to that representative of a binary "0." This magnetic state and its direction is represented in the drawing by the arrow 20.

The information stored in the circuit is subsequently read out by the application of negative read-out current pulses 17″ from the sources 17 to the access wires 14. The pulses 17″ are each of a magnitude sufficient to produce a magnetic field which exceeds the threshold required to reverse the remanent magnetizations switched from the clear state in the tape 18 during a previous write phase. A read-out pulse 17″ applied to access wire $\mathbf{14}_1$ from source $\mathbf{17}_1$ therefore reverses the magnetic flux in the bit address associated with the latter wire $\mathbf{14}_1$, which bit address contains a binary "1." This flux reversal induces an output signal indicative of the binary "1" in access wire 13 which signal is detected by the output detection circuit 16. A subsequent read-out current pulse 17″ applied to access wire $\mathbf{14}_2$ from source $\mathbf{17}_2$ has no appreciable effect upon the magnetic flux in the bit address containing a binary "0" associated with wire $\mathbf{14}_2$ since the field generated by the signal tends to drive the flux in the direction in which it was already set. Thus, there is no signal, or at most a small shuttle signal, induced in the access wire 13 as a result of the read-out signal applied to wire $\mathbf{14}_2$. This signal condition is conventionally indicative of a binary "0." A subsequent read-out current pulse 17″ applied to access wire $\mathbf{14}_3$ associated with the address also containing a binary "1" from source $\mathbf{17}_3$ will likewise produce an output signal on wire 13, which output signal is indicative of the binary "1" and which output signal is detected by circuit 16 in a manner similar to the detection of the output signal produced by the read-out current pulse previously applied to wire $\mathbf{14}_1$.

Since the remanent magnetic flux in each information address of the embodiment depicted in the drawing is completed through the tape 18 and the tube 10, there are no appreciable air return flux paths in this embodiment. Consequently, since the detrimental demagnetizing effects of such air paths are eliminated, the information addresses may be located more closely together and each address may be shorter in length than in related wire memory elements. Furthermore, elements such as that depicted in the drawing may also be placed more closely together in a multi-element array for the same reasons. Thus, a greater information storage density may be obtained in an array comprising elements according to the principles of the present invention.

Since the information addresses along the element depicted in the drawing may be packed more closely together than those of the aforementioned wire memory elements and since most of the remanent flux in each bit address is confined to the high permeability tube 10, the magnetic reluctance of each bit address in the present invention is much less than the reluctance presented by a bit address of known wire memory elements. Consequently, much smaller current drives may be used on the access wires of the present invention than may be utilized with the wire memory elements.

Because of the absence of detrimental demagnetizing fields in the present invention, the tape 11 may also be of a material having a lower coercive force than that usually required of the helical tapes associated with the magnetic wire elements. When demagnetizing fields are present, the tape must have a coercive force greater than a certain minimum value since stray demagnetizing fields may otherwise exceed the coercive force of the material and lead to erroneous switchings of the magnetic flux associated with the bit addresses. The permissible use in this invention of magnetic material having a lower coercive force permits a still further decrease in the magnitude of the current drive signals applied to the access wires.

Conversely, with current values conventionally employed in magnetic wire memory elements, material of a higher coercive force is advantageously permitted for use in connection with the helical tape 18. The use of material having a higher coercive force, in some cases, enables faster switching of the remanent magnetic flux about the bit addresses to be realized. Switching time is generally related to the magnitude of the applied field and in circuits using coincident current selection the switching field is the vector sum of the applied half-select fields. This switching field may exceed the threshold of the material to which it is applied by larger margins, therefore causing faster switching, as materials having larger coercive forces are utilized. Thus the present invention permits the use of switching material having a high coercive force, such as iron, with its consequent faster switching, without necessitating an increase in the current drives applied to the access wires.

What has been described is considered to be only one illustrative embodiment according to the principles of this invention. Advantageously, a number of elements of the type described may be arranged to form a word-organized array. Each access wire 14 is such an arrangement would be threaded through corresponding holes 12 of a plurality of tubes 10 and a single binary word may advantageously be stored in the information addresses associated with a single one of the wires 14. The writing and reading operations are accomplished in a conventional word and bit select manner. In addition, it is to be understood that numerous other arrangements may be devised by one skilled in the art without departing from the spirit and scope of this invention.

What is claimed is:

1. A memory device comprising a high permeability magnetic tube having a single longitudinal slot therein and apertures therein othogonally transverse to said slot, a first electrical conductor threading said tube, a second electrical conductor threading said apertures, a magnetic element having substantially rectangular hysteresis characteristics inductively coupled to said tube and said first and second electrical conductors, and means for selectively applying current to said first and second electrical conductors.

2. A magnetic memory circuit comprising a tube of high permeability magnetic material having a single longitudinal slot and a plurality of holes therein, a first access wire threaded longitudinally through said tube, a plurality of second access wires threading respectively said plurality of holes and orthogonally crossing first access wire, a plurality of strips of magnetic material having a substantially rectangular hysteresis loop inductively coupled to said tube and crossing said slot at the intersections of said first and second access wires, said intersections defining information addresses on said strips, means for applying half-select currents of one polarity to said first wire and to selected ones of said second wires to establish remanent magnetizations in one direction in selected ones of said information addresses, means for subsequently applying currents of the other polarity to said second wires to reverse the remanent magnetizations in said selected information addresses, and detecting means for detecting flux reversals in said selected information addresses.

3. A magnetic memory circuit as claimed in claim 2 in which said detecting means includes said first access wire.

4. A magnetic memory circuit as claimed in claim 3 in which said pluraltiy of strips comprise segments of a continuous tape helically wound about said tube.

5. A magnetic memory circuit comprising a first and a second orthogonally intersecting access wire, a high permeability magnetic sheet partially wrapped about said first access wire, a magnetic strip having substantially rectangular hysteresis characteristics inductively coupled to said first and second access wires at a single open portion of said sheet, means for coincidently applying half-select write currents to said first and second access wires to induce a remanent magnetization in said strip representative of a particular binary value, means for applying a read-out current to said second access wire to reverse said magnetization, and means including said first access wire for detecting said magnetization reversal.

6. A memory device comprising a high permeability magnetic tube having a single longitudinal slot therein and a plurality of apertures in opposite portions thereof orthogonally transverse to said slot, a first access wire threading said tube, a plurality of second access wires threading respectively said plurality of apertures, a magnetic tape having substantially rectangular hysteresis characteristics wound about said tube and crossing said slot at the intersections of said first and second access wires, means including a first current source for applying a first write pulse to said first access wire, and means including second current sources for selectively applying second write current pulses to said second access wires coincidently with said first write current pulse for inducing remanent magnetizations in said tape representative of particular binary information bits.

7. A memory device as claimed in claim 6 also comprising read-out means including read-out current sources for applying switching currents to said second access wires for reversing said remanent magnetizations and output means energized responsive to magnetization reversals in said tape for generating output signals indicative of said particular binary information bits.

8. A memory device as claimed in claim 7 in which said output means includes said first access wire.

9. A memory device comprising a helical first magnetic element having substantially rectangular hysteresis characteristics, a first access wire axially coincident with said first magnetic element, a second access wire arranged orthogonally transverse to said first access wire, said access wires defining an information address on said first magnetic element at their intersection, means for applying coincident current pulses to said access wires for inducing a remanent flux in said first magnetic element at said information address representative of a binary information bit and a second magnetic element having a high magnetic permeability disposed at said intersection of said access wires and so inductively coupled to said first magnetic element as to provide a low reluctance closure path for said remanent flux.

10. A memory device as claimed in claim 9, in which said second magnetic element comprises a tube enwrapping said first access wire and having a single longitudinal opening therein at said information address.

References Cited in the file of this patent

UNITED STATES PATENTS

| | | |
|---|---|---|
| 2,825,891 | Duinker | Mar. 4, 1958 |
| 2,911,627 | Kilburn et al. | Nov. 3, 1959 |

OTHER REFERENCES

Publication I: The Bell System Technical Journal, vol. 36, No. 6, November 1957, pp. 1319–1340, #70A.

Publication II: Electrical Manufacturing, February 1959, pp. 56–60, No. 89A.